United States Patent
Stark (10) Patent No.: US 11,484,954 B2
(45) Date of Patent: Nov. 1, 2022

(54) MILLING TOOL HOLDER AND MILLING TOOL

(71) Applicant: Hartmetall-Werkzeugfabrik Paul Horn GmbH, Tübingen (DE)

(72) Inventor: Christian Stark, Rottenburg (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 196 days.

(21) Appl. No.: 16/807,363

(22) Filed: Mar. 3, 2020

(65) Prior Publication Data
US 2020/0198028 A1 Jun. 25, 2020

Related U.S. Application Data

(63) Continuation of application No. PCT/EP2018/085966, filed on Dec. 19, 2018.

(30) Foreign Application Priority Data

Dec. 21, 2017 (DE) .................... 10 2017 131 001.0

(51) Int. Cl.
*B23C 5/24* (2006.01)
*B23C 5/08* (2006.01)

(52) U.S. Cl.
CPC .............. *B23C 5/2472* (2013.01); *B23C 5/08* (2013.01)

(58) Field of Classification Search
CPC ....... B23C 5/2472; B23C 5/08; B23C 5/2417; B23C 5/2434; B23C 5/2451;
(Continued)

(56) References Cited

U.S. PATENT DOCUMENTS

| | | | |
|---|---|---|---|
| 2,592,382 A | 4/1952 | Blais | |
| 4,936,717 A | 6/1990 | Bosek | |

(Continued)

FOREIGN PATENT DOCUMENTS

| | | |
|---|---|---|
| AT | 189883 | 5/1957 |
| CN | 88211122 U | 11/1988 |

(Continued)

OTHER PUBLICATIONS

Kellner, Karl-Heinz, "Cutting tool is clamped on drive shaft by clamping device and has tool part that is connected with clamping device, where another tool part is adjustable in axial direction",Link: https://worldwide.espacenet.com/patent/search/family/042664291/public Last Retrieved Apr. 18, 2022 (Year: 2009).*

(Continued)

*Primary Examiner* — Boyer D Ashley
*Assistant Examiner* — Stephen Sun Cha
(74) *Attorney, Agent, or Firm* — Jason H. Vick; Sheridan Ross, PC (57) ABSTRACT

Milling tool holder which comprises a first holder part, a second holder part, and a locking mechanism. The first holder part comprises a first cutting insert receptacle for receiving a first cutting insert and a second cutting insert receptacle for receiving a second cutting insert. The second holder part which, for adjusting a milling width, is variably positionable with respect to the first holder part along a longitudinal axis, comprises a third cutting insert receptacle for receiving a third cutting insert and a fourth cutting insert receptacle for receiving a fourth cutting insert. The locking mechanism is configured to fix the first and second holder parts to the adjusted milling width. The first holder part and the second holder part are positioned with respect to one another in such a manner that the third cutting insert receptacle is arranged in the circumferential direction (Continued)

between the first cutting insert receptacle and the second cutting insert receptacle, and that the second cutting insert receptacle is arranged in the circumferential direction between the third cutting insert receptacle and the fourth cutting insert receptacle.

20 Claims, 6 Drawing Sheets

(58) Field of Classification Search
CPC ............ B23C 2240/24; B23C 2240/32; B23C 2240/00; B23C 2210/02; B23C 2210/244
See application file for complete search history.

(56) References Cited

U.S. PATENT DOCUMENTS

| | | |
|---|---|---|
| 9,283,631 B2 | 3/2016 | Sjoo et al. |
| 2006/0086424 A1 | 4/2006 | Spector et al. |
| 2009/0092452 A1 | 4/2009 | Sato et al. |

FOREIGN PATENT DOCUMENTS

| | | |
|---|---|---|
| CN | 101432090 A | 5/2009 |
| CN | 102632302 A | 8/2012 |
| CN | 203526662 U | 4/2014 |
| CN | 106312160 A | 1/2017 |
| DE | 192233 C | 11/1907 |
| DE | 536135 C | 10/1931 |
| DE | 1179080 B | 10/1964 |
| DE | 2503830 A1 | 7/1976 |
| DE | 2754499 A1 | 6/1979 |
| DE | 8910441 U1 | 11/1989 |
| DE | 102007001864 A1 | 7/2008 |
| DE | 102009022051 B3 | 9/2010 |
| DE | 102017110754 A1 | 11/2018 |
| JP | S55-58910 A | 5/1980 |
| JP | 2010-000569 A | 1/2010 |
| JP | 2010000569 A * | 1/2010 |
| SU | 848188 A1 | 7/1981 |
| SU | 908553 A1 | 2/1982 |
| SU | 1296318 A1 | 3/1987 |
| WO | WO 2015/017874 | 2/2015 |
| WO | WO 2015/104730 | 7/2015 |

OTHER PUBLICATIONS

International Preliminary Report on Patentability for International Application No. PCT/EP2018/085966, dated Jul. 2, 2020.
Notification of Reasons for Rejection (Including Translation) for corresponding Japanese Patent Application No. 2020-515703, dated May 25, 2021.
Decision to Grant a Patent for an Invention (Including Translation) for corresponding Russian Application No. 2020109573/12(015802), dated Sep. 2, 2020.
Office Action for corresponding Chinese Patent Application No. 201880067125.2, dated Dec. 2, 2020.
International Search Report for International Application No. PCT/EP2018/085966, dated Mar. 26, 2019.
Written Opinion for International Application No. PCT/EP2018/085966, dated Mar. 26, 2019.

* cited by examiner

MILLING TOOL HOLDER AND MILLING TOOL

CROSS REFERENCE TO RELATED APPLICATIONS

This application is a continuation of international patent application PCT/EP2018/085966, filed on Dec. 19, 2018 designating the U.S., which international patent application has been published in German language and claims priority from German patent application DE 10 2017 131 001.0, filed on Dec. 21, 2017. The entire contents of these priority applications are incorporated herein by reference.

BACKGROUND OF THE INVENTION

This disclosure relates to a milling tool holder and to a milling tool having a milling tool holder and multiple cutting inserts arranged thereon. The present milling tool is suitable, in particular, as a grooving and cutting milling cutter. This disclosure, however, is not restricted to said type and application. In principle, other milling applications are also eligible for the milling tool according to this disclosure.

Grooving and cutting milling cutters are used for cutting-off workpieces and for forming grooves in workpieces. WO 2015/017874 A1 shows a grooving and cutting milling cutter as an example.

With their mainly substantially disk-shaped design, grooving and cutting milling cutters form a subgroup of disk cutters. The substantially disk-shaped basic body is mostly rotationally symmetrical to a longitudinal axis. A plurality of cutting inserts for machining the workpiece to be processed are arranged on the outer circumference of the basic body. The cutting inserts protrude, in this case, in the axial direction on both sides of the disk-shaped basic body. The basic body itself is frequently produced from a tool steel, whereas the cutting inserts are mostly produced from hard metal. Depending on the type of milling cutter, the cutting inserts are fastened either permanently or releasably to the basic body by soldering, welding, clamping or screw-connecting. Releasable fastening by means of clamping or screw-connecting enables simple replacement of the cutting inserts if they are worn, whereas soldered-on or welded-on cutting inserts have to be reground when worn.

The most varied sizes of grooving and cutting milling cutters are used depending on the type of application and on the workpiece to be processed. A plurality of the most varied sizes of grooving and cutting milling cutters have to be provided for producing multiple, differently-sized grooves. This is not only costly for the user of the milling machine but also involves increased storage costs.

SUMMARY OF THE INVENTION

It is an object to provide a milling cutter which is able to be adjusted variably to different milling widths and, in this case, nevertheless meets the high requirements for strength, stability and precision.

According to a first aspect, a milling tool holder is presented, which comprises:

a first holder part having a first cutting insert receptacle which is configured to receive a first cutting insert and having a second cutting insert receptacle which is configured to receive a second cutting insert;

a second holder part which is variably positionable with respect to the first holder part along a longitudinal axis in order to adjust a milling width, wherein the second holder part comprises a third cutting insert receptacle for receiving a third cutting insert and a fourth cutting insert receptacle for receiving a fourth cutting insert;

a spacer element which is arranged between the first holder part and the second holder part and which is configured for adjusting the milling width;

a locking mechanism which is configured to fix the first and second holder parts to the adjusted milling width, wherein the first holder part and the second holder part are positioned with respect to one another in such a manner that the third cutting insert receptacle is arranged in the circumferential direction between the first cutting insert receptacle and the second cutting insert receptacle, and in that the second cutting insert receptacle is arranged in the circumferential direction between the third cutting insert receptacle and the fourth cutting insert receptacle, wherein the first holder part comprises a first cylinder surface which is configured to center the spacer element, wherein the first cylinder surface extends symmetrically to the longitudinal axis, and wherein the second holder part comprises a second cylinder surface which is configured to center the spacer element, wherein the second cylinder surface extends symmetrically to the longitudinal axis.

According to a second aspect, a milling tool holder is presented, which comprises:

a first holder part having a first cutting insert receptacle which is configured to receive a first cutting insert and having a second cutting insert receptacle which is configured to receive a second cutting insert;

a second holder part which is variably positionable with respect to the first holder part along a longitudinal axis in order to adjust a milling width, wherein the second holder part comprises a third cutting insert receptacle for receiving a third cutting insert and a fourth cutting insert receptacle for receiving a fourth cutting insert;

a spacer element which is arranged between the first holder part and the second holder part and which is configured for adjusting the milling width;

a locking mechanism which is configured to fix the first and second holder parts to the adjusted milling width, wherein the first holder part and the second holder part are positioned with respect to one another in such a manner that the third cutting insert receptacle is arranged in the circumferential direction between the first cutting insert receptacle and the second cutting insert receptacle, and in that the second cutting insert receptacle is arranged in the circumferential direction between the third cutting insert receptacle and the fourth cutting insert receptacle, and wherein the spacer element comprises a first annular contact surface which abuts the second holder part and is arranged perpendicularly to the longitudinal axis.

According to a third aspect, a milling tool is presented, which comprises:

a first holder part having a first cutting insert receptacle which is configured to receive a first cutting insert and having a second cutting insert receptacle which is configured to receive a second cutting insert;

a second holder part which is variably positionable with respect to the first holder part along a longitudinal axis in order to adjust a milling width, wherein the second holder part comprises a third cutting insert receptacle for receiving a third cutting insert and a fourth cutting insert receptacle for receiving a fourth cutting insert;

a spacer element which is arranged between the first holder part and the second holder part and which is configured for adjusting the milling width;

a locking mechanism which is configured to fix the first and second holder parts to the adjusted milling width; a first cutting insert which is arranged in the first cutting insert receptacle;

a second cutting insert which is arranged in the second cutting insert receptacle;

a third cutting insert which is arranged in the third cutting insert receptacle;

a fourth cutting insert which is arranged in the fourth cutting insert receptacle wherein the first holder part and the second holder part are positioned with respect to one another in such a manner that the third cutting insert is arranged in the circumferential direction between the first cutting insert and the second cutting insert, and in that the second cutting insert is arranged in the circumferential direction between the third cutting insert and the fourth cutting insert, wherein the first holder part comprises a first cylinder surface which is configured to center the spacer element, wherein the first cylinder surface extends symmetrically to the longitudinal axis, and wherein the second holder part comprises a second cylinder surface which is configured to center the spacer element, wherein the second cylinder surface extends symmetrically to the longitudinal axis.

According to a fourth aspect, a milling tool is presented, which comprises:

a first holder part having a first cutting insert receptacle which is configured to receive a first cutting insert and having a second cutting insert receptacle which is configured to receive a second cutting insert;

a second holder part which is variably positionable with respect to the first holder part along a longitudinal axis in order to adjust a milling width, wherein the second holder part comprises a third cutting insert receptacle for receiving a third cutting insert and a fourth cutting insert receptacle for receiving a fourth cutting insert;

a spacer element which is arranged between the first holder part and the second holder part and which is configured for adjusting the milling width;

a locking mechanism which is configured to fix the first and second holder parts to the adjusted milling width; a first cutting insert which is arranged in the first cutting insert receptacle;

a second cutting insert which is arranged in the second cutting insert receptacle;

a third cutting insert which is arranged in the third cutting insert receptacle;

a fourth cutting insert which is arranged in the fourth cutting insert receptacle wherein the first holder part and the second holder part are positioned with respect to one another in such a manner that the third cutting insert is arranged in the circumferential direction between the first cutting insert and the second cutting insert, and in that the second cutting insert is arranged in the circumferential direction between the third cutting insert and the fourth cutting insert, and wherein the spacer element comprises a first annular contact surface which abuts the second holder part and is arranged perpendicularly to the longitudinal axis.

The herein presented milling tool holder comprises two holder parts which are variably positionable with respect to one another along the longitudinal axis in order to be able to adjust the milling width to the desired size. As soon as the user has positioned the two holder parts relatively to one another and the desired milling width has been set, the two holder parts can be fixed with respect to one another by means of a locking mechanism.

A locking mechanism is to be understood in the present case as the type of mechanical device by means of which two or more parts which are movable with respect to one another can be fixed. Such a locking mechanism can comprise any type of latching, screwing, clamping, bolting or tensioning element. The locking mechanism serves in the present case for the purpose of preventing an unintentional change in the set milling width when the milling tool is being used.

A further advantage of the herein presented milling tool consists in the type and manner in which the two holder parts, in the mounted state, that is to say, for example, with the locking mechanism fixed, are positioned with respect to one another. The two holder parts interlock similarly to a type of toothing system. Put another way, it could also be said that the two holder parts are nested in one another. When viewed in the circumferential direction of the milling tool holder, that is to say circumferentially around the longitudinal axis of the milling tool holder, the cutting insert receptacles of the two holder parts are each arranged alternately. One cutting insert receptacle, which is arranged on the second holder part, is arranged in each case between two cutting insert receptacles which are arranged on the first holder part. Conversely, one cutting insert receptacle, which is arranged on the first holder part, is also arranged in each case between two cutting insert receptacles which are arranged on the second holder part. The first holder part and the second holder part consequently contact one another along the circumference at multiple torque driving points which are spaced from one another in the circumferential direction. This results in an optimum torque transmission between the two holder parts.

In spite of the adjustable milling width, extremely high mechanical stability of the milling tool holder is ensured in this way. The herein presented milling tool does not differ consequently in terms of precision, stability and strength from milling tools of the same type where the milling width is fixed, that is to say which are not variably adjustable.

It should be noted that with reference to the herein presented milling tool holder and to the herein presented milling tool, four cutting insert receptacles or four cutting inserts are discussed in each case. On the one hand, in this respect it should be noted that this is just the minimum number of cutting insert receptacles and cutting inserts. Obviously, the milling tool holder can also comprise more cutting insert receptacles depending on the application and desire. On the other hand, in this respect it should be noted that the cutting inserts, although preferred, do not forcibly have to be fastened releasably to the milling tool holder but can also be fastened to it permanently (for example by soldering or welding) or can even be connected integrally to it. The cutting inserts can also be produced from the same material as the milling tool holder. In principle, however, it is preferred for the cutting inserts to be produced from hard metal and the milling tool holder from steel.

According to a refinement, the first holder part comprises a connecting flange for clamping the milling tool in a tool receptacle of a power tool, whereas the second holder part is designed in a substantially disk-shaped manner.

The second holder part, according to said refinement, is therefore placed as a type of disk onto the first holder part. The connection between the two holder parts together or the fixing of the two holder parts relatively to one another is effected, as already mentioned, via the locking mechanism, which preferably comprises a clamp screw.

According to a further refinement, the milling tool holder comprises a spacer element which serves for adjusting the milling width and is arranged between the first holder part and the second holder part.

Said spacer element serves not only for adjusting the distance between the two holder parts, it also assumes the function of transmitting the axial force (along the longitudinal axis) between the first holder part and the second holder part.

According to a refinement, the spacer is designed as a sleeve. Said sleeve is preferably arranged in the first holder part and is clamped with the second holder part by means of the locking mechanism. To adjust the milling width, the spacer element can be arranged at different positions distributed along the longitudinal axis in relation to the first holder part.

According to a refinement, the positioning of the spacer element relative to the first holder part is preferably effected via a screw connection between both components. In said refinement, the spacer element comprises a first thread which corresponds with a second thread arranged in the first holder part, wherein the interaction between the first thread and the second thread serves for adjusting the milling width.

The adjusting of the milling width is effected in said refinement, therefore, as a result of the spacer element being screwed to a greater or lesser extent into the first holder part. The further the spacer element is screwed into the first holder part, the smaller the distance between the first holder part and the second holder part and accordingly the smaller the milling width set. The less the spacer element is screwed into the first holder part, the greater the distance between the two holder parts and accordingly the greater the milling width. This enables the milling width to be steplessly adjusted.

According to a further refinement, the spacer element contacts the second holder part along an annular contact surface.

Said annular contact surface is preferably arranged perpendicularly to the longitudinal axis of the milling tool holder. The annular contact surface serves as planar support for the axial support of the second holder part on the spacer element. The advantage of the annular contact surface, in particular, is that as a result wobble errors, which could otherwise arise if axial forces were introduced unevenly in the case of such a multi-part design of the milling tool, are minimized.

According to a further refinement, the first holder part comprises a first cylinder surface for centering the spacer element, wherein the first cylinder surface extends symmetrically to the longitudinal axis of the milling tool holder. Likewise, the second holder part preferably also comprises a second cylinder surface for centering the spacer element, wherein the second cylinder surface extends symmetrically to the longitudinal axis of the milling tool holder. The two cylinder surfaces preferably extend coaxially with respect to one another but are offset with respect to one another along the longitudinal axis.

Two corresponding cylinder surfaces, which correspond with the cylinder surfaces (first and second cylinder surfaces) arranged on the two holder parts, are also arranged on the spacer element. A clearance fit is preferably provided between the cylinder surfaces of the spacer element and the corresponding cylinder surfaces of the two holder parts. Said clearance fit has to be dimensioned such that the axial run-out tolerance and the concentricity tolerance is kept as small as possible. Too much play between the cylinder surfaces could lead to both holder parts tilting toward one another.

According to a further refinement, the locking mechanism comprises a clamp screw which is screwable through the spacer element into a third thread which is arranged in the first holder part. In a preferred manner, therefore, both the spacer element and the clamping screw, which serves as a locking mechanism, are screwed into the first holder part. In a particularly preferred manner, both screw connections are realized by a fine-pitch thread. The realization of the first and second threads as a fine-pitch thread serves, in particular, for the possibility of fine adjustment of the milling width. The advantage of the realization of the third thread as a fine-pitch thread, in contrast, is that the height of the third thread is limited overall.

In the above-named refinement, according to which the locking mechanism comprises a clamp screw, it is provided in a preferred manner that, in the screwed-in state, the clamp screw contacts the first holder part and the second holder part but not the spacer element.

In said refinement, the clamp screw therefore contacts just the two holder parts but not the spacer. In addition, it is preferred for the two holder parts to contact one another simply for the transmission of torque in the circumferential direction, however not for transmitting axial and radial forces. The transmission of axial and radial forces between the two holder parts preferably takes place exclusively via the spacer element and the clamp screw.

According to a further refinement, the clamp screw contacts the second holder part along a conical surface. Said conical surface is preferably symmetrical to the longitudinal axis of the milling tool holder.

The advantage of the conical surface, in particular, is that forces can be transmitted between clamp screw and second holder part both in the axial and in the radial direction at the same time using the conical surface.

According to a further refinement, the milling tool holder additionally comprises an adjustment adapter for adjusting the position of the spacer element, wherein the spacer element comprises a first tool engagement which fits the adjustment adapter, and wherein the adjustment adapter additionally comprises a second tool engagement.

In principle, it is also conceivable for the spacer element to be adjusted manually for adjusting the milling width. The adjustment adapter, however, makes simpler handling of the adjustment of the milling width possible.

To adjust the milling width, the locking mechanism is released. In the above-described case the clamp screw is released for this purpose. The spacer element can then be newly positioned between the first and second threads by means of the screw connection. To this end, the adjustment adapter can be introduced from outside into the first tool engagement provided in the spacer element. In order then to rotate the adjustment adapter together with the spacer element in relation to the first and second holder parts, a tool which engages in the second tool engagement on the adjustment adapter is used. The two tool engagements are preferably internal multifaceted collars.

The torque driving between the first holder part and the second holder part is effected, as already mentioned, preferably via multiple torque driving faces which are arranged distributed along the circumference of the milling tool holder. According to a preferred refinement, it is provided in this respect that the first holder part and the second holder part contact one another along multiple torque driving faces which correspond with one another, wherein the torque driving faces enclose an angle <5° with a radial direction which extends perpendicularly with respect to the longitudinal axis and to the circumferential direction. Very efficient torque transmission is ensured as a result.

It is obvious that the features named above and the features yet to be explained below are usable not only in the combination specified in each case but also in other combinations or standing alone without departing from the spirit and scope of the present disclosure.

DESCRIPTION OF PREFERRED EMBODIMENTS

FIGS. 1-10 show various views and different states of an exemplary embodiment of the milling tool. The illustration of the different states serves for explaining the function of the milling tool. The milling tool is designated in each of FIGS. 1-10 overall by way of the reference numeral 100.

The milling tool 100 comprises a milling tool holder 10 and multiple cutting inserts 12 which are arranged on the milling tool holder 10. Four of said cutting inserts are provided as an example in FIG. 1 with the reference symbols 12a-12d. Purely for the purposes of explanation, said cutting inserts are numbered consecutively as follows: The cutting insert 12a is designated as the first cutting insert, the cutting insert 12b is designated as the second cutting insert, the cutting insert 12c is designated as the third cutting insert and the cutting insert 12d is designated as the fourth cutting insert.

In the exemplary embodiment shown in the present case, a total of fourteen of said cutting inserts 12 are arranged on the milling tool holder. The minimum number of cutting inserts 12 necessary for the method of operation is, however, only four. In principle, however, the milling tool 100 can comprise any arbitrary number of cutting inserts 12 greater than four. The milling tool 100 preferably comprises an even number of cutting inserts 12.

Figure 1:
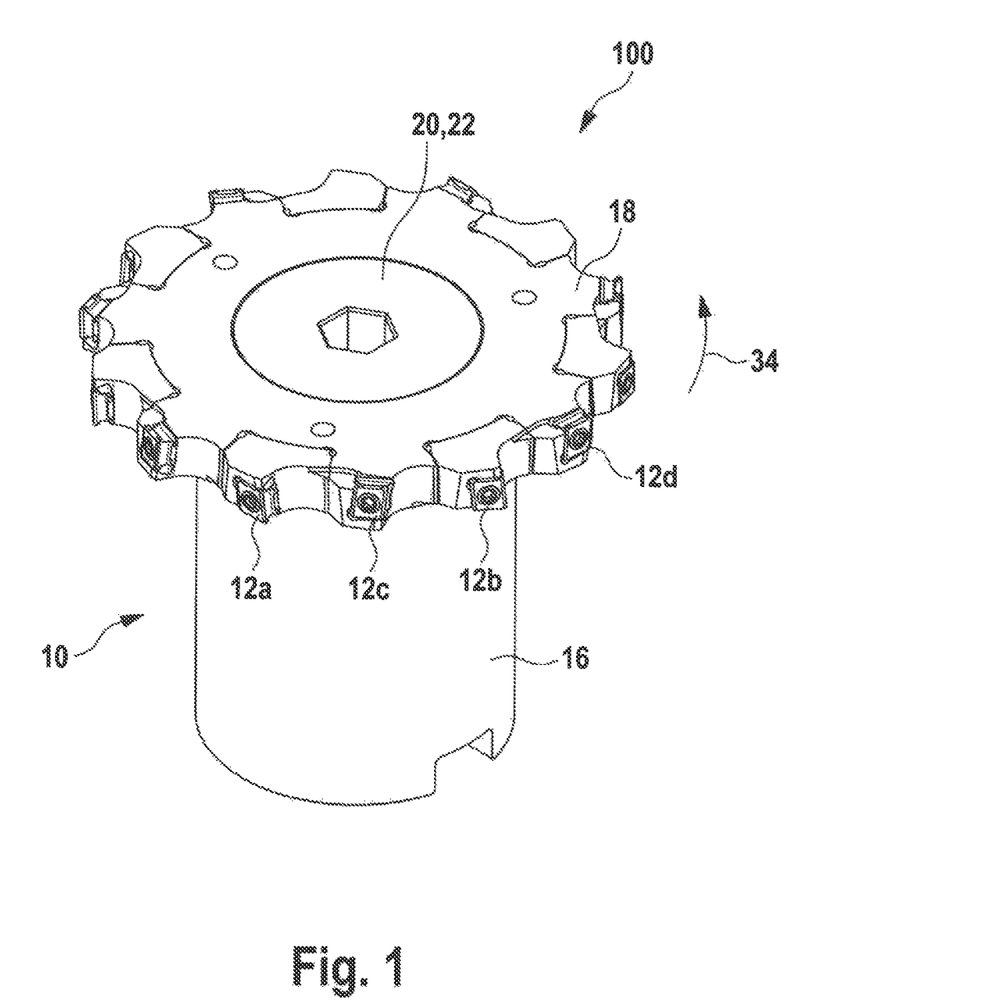
FIG. 1 shows a perspective view of an exemplary embodiment of the milling tool.
Figure 2:
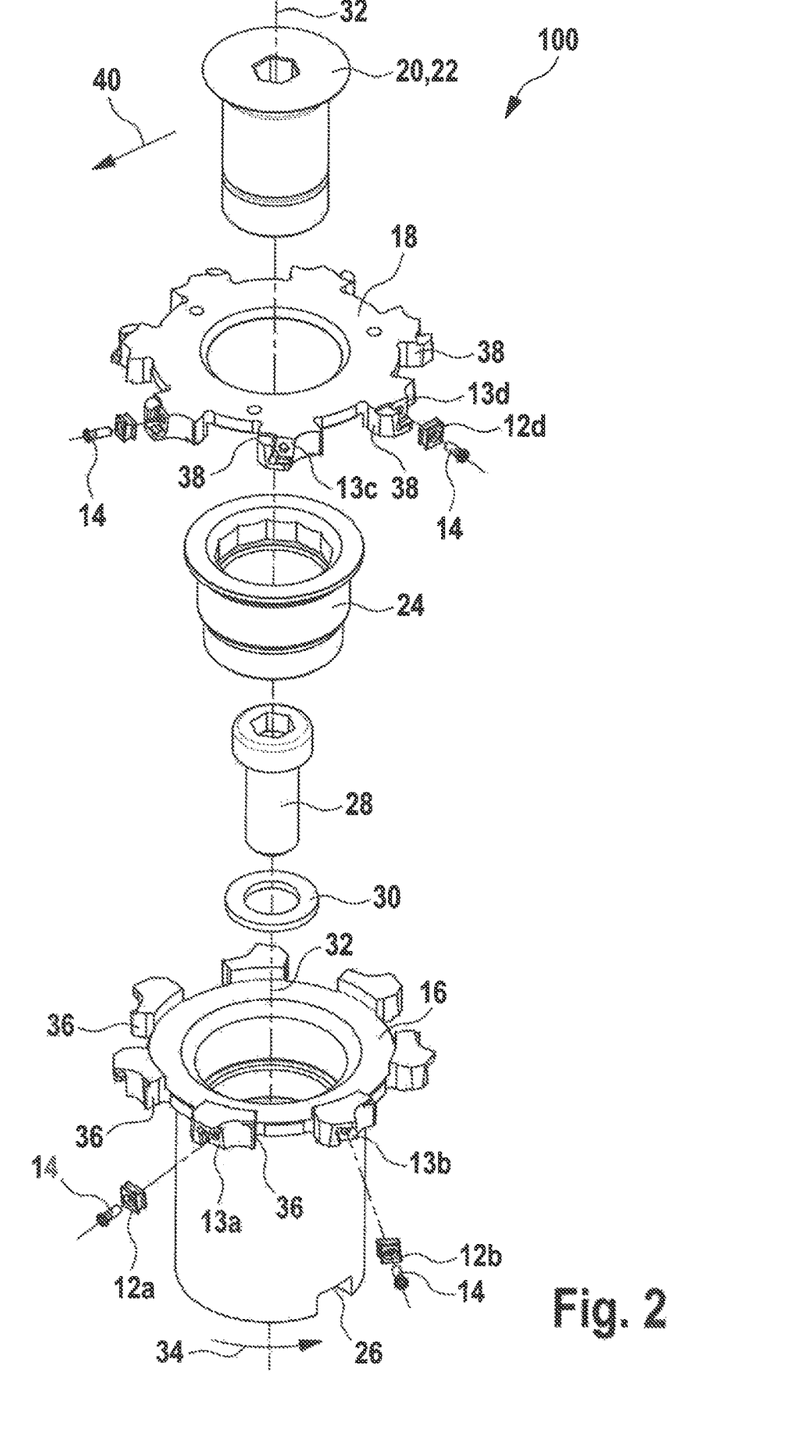
FIG. 2 shows an exploded representation of the exemplary embodiment shown in FIG. 1.

According to the present exemplary embodiment, the cutting inserts 12 are fastened releasably on the milling tool holder 10 by means of fastening screws 14 (see FIG. 2). The cutting inserts 12 are arranged releasably in cutting insert receptacles 13 provided for this purpose, only four of said cutting insert receptacles 13a-13d being provided once again as examples with reference symbols in FIG. 2. In an equivalent manner to the naming of the cutting inserts 12a-12d, the cutting insert receptacles 13a-13d in the present case are also designated as follows: First cutting insert receptacle 13a, second cutting insert receptacle 13b, third cutting insert receptacle 13c and fourth cutting insert receptacle 13d.

However, it is also equally conceivable for the cutting inserts 12 to be fastened releasably or permanently to the milling tool holder 10 in another manner, for example by clamping, soldering or welding. Irrespective of the type of fastening, the cutting inserts 12 are preferably produced from hard metal, the milling tool holders 10, in contrast, preferably from steel.

The milling tool holder 10 is designed with multiple parts. It comprises a first holder part 16 and a second holder part 18. The two holder parts 16, 18 are movable with respect to one another. This is not naturally the case in the mounted state. The two holder parts 16, 18, however, can be positioned with respect to one another in different positions which are choosable by the user for adjusting the milling width. By means of a locking mechanism 20 which comprises a clamping screw 22 in the present case, the two holder parts 16, 18 can be fixed or secured with respect to one another in the desired position (corresponding to the milling width set). The distance between the two holder parts 16, 18 can preferably be adjusted in a stepless manner.

In the present exemplary embodiment, a spacer element 24 serves for adjusting the milling width, that is to say for varying the relative position between the two holder parts 16, 18. In the exemplary embodiment shown in the present case, said spacer element 24 is designed as a sleeve which can be screwed into the first holder part 16. As can be seen, in particular, in FIGS. 3-10 and is explained in detail below, the distance between the first holder part 16 and the second holder part 18 is reduced the further the spacer element 24 is screwed into the first holder part 16. This results then in a correspondingly smaller milling width during the use of the milling tool 100. The further the spacer element 24 is screwed out of the first holder part 16, conversely, the greater the distance between the first holder part 16 and the second holder part 18 and accordingly the greater the milling width set.

The milling tool 100 is usually clamped in a tool receptacle provided for this purpose. To this end, the first holder part 16 comprises a connecting flange 26 at its lower end. Said connecting flange 26 serves together with a fastening screw 28 and an associated washer 30 for fastening or fixing the milling tool 100 to the tool receptacle.

In particular as a result of the connecting flange 26, the first holder part 16 has a substantially elongated form which corresponds quite roughly in cross section to a T-shaped form. The second holder part 18, in contrast, is designed to be substantially disk-shaped. It is placed onto the top side of the first holder part 16. As will be explained in more detail again later, the second holder part 18 does not rest directly, however, on the first holder part 16 in the axial direction but on the spacer element 24.

Both holder parts 16, 18, as also the entire milling tool 100, are preferably symmetrical to a longitudinal axis 32. The two holder parts 16, 18 are nested in one another in the mounted state. It could also be said they engage in one another similarly to gearwheels. When viewed in the circumferential direction 34, that is to say around the longitudinal axis 32, a cutting insert receptacle 13 which is associated with the second holder part 18 is arranged in each case between two cutting insert receptacles 13 arranged on the first holder part 16. Conversely, a cutting insert receptacle 13 which is associated with the first holder part 16 is also arranged in each case between two cutting insert receptacles 13 of the second holder part 18. Thus, for example, the third cutting insert receptacle 13c is arranged in the circumferential direction between the first cutting insert receptacle 13a and the second cutting insert receptacle 13b, the third cutting insert receptacle 13c being associated with the second holder part 18 and the first and second cutting insert receptacles 13a, 13b being associated with the first holder part 16. In the same way, the second cutting insert receptacle 13b which is associated with the first holder part 16 is arranged between the third cutting insert receptacle 13c and the fourth cutting insert receptacle 13d which are associated with the second holder part 18. Torque-driving faces 36 which are arranged on the first holder part 16 and correspond with corresponding torque-driving faces 38 which are arranged on the second holder part 18 take care of the torque transmission from the first holder part 16 to the second holder part 18. Said torque-driving faces 36, 38 which correspond with one another preferably extend along a radial direction 40 of the tool 100 which is arranged perpendicularly to the longitudinal axis 32 and perpendicularly to the circumferential direction 34. The torque-driving faces 36, 38 enclose with said radial direction 40 at least an angle <5°. In relation to the longitudinal axis 32, the torque driving faces 36, 38 extend either parallel thereto or they are inclined slightly thereto.

The cutting inserts 12 arranged on the first holder part 16 protrude from the head part of the milling tool holder 10 in a different direction in relation to the cutting inserts 12 arranged on the second holder part 18. The first and the second cutting inserts 12a, 12b, which are arranged on the first holder part 16, protrude, for example, downward from the head part of the milling tool holder 10, whereas the third and fourth cutting inserts 12c, 12d, which are arranged on the second holder part 18, protrude upward from the head part of the milling tool holder 10. In the present case, the terms "downward" and "upward" mean two directions which are aligned in opposite directions to one another and are parallel to the longitudinal axis 32. Slightly different cutting inserts are used for the cutting inserts 12 arranged on the first holder part 16 than for the second holder part 18. The cutting inserts arranged on the two holder parts 16, 18 are certainly basically the same as regards type, however they are designed in a mirror-inverted manner to one another. In technical jargon in this respect, they are mostly referred to as left and right cutting inserts which are arranged in the present case in alternate rows on the first and on the second holder parts 16, 18. It should also be noted at this point that the cutting inserts 12 in the present case are arranged tangentially to the two holder parts 16, 18. However, this is not absolutely. The cutting inserts 12 can also be arranged just as well axially or in another alignment on the milling tool holder 10 without departing from the spirit and scope of the disclosure.

Figure 3:
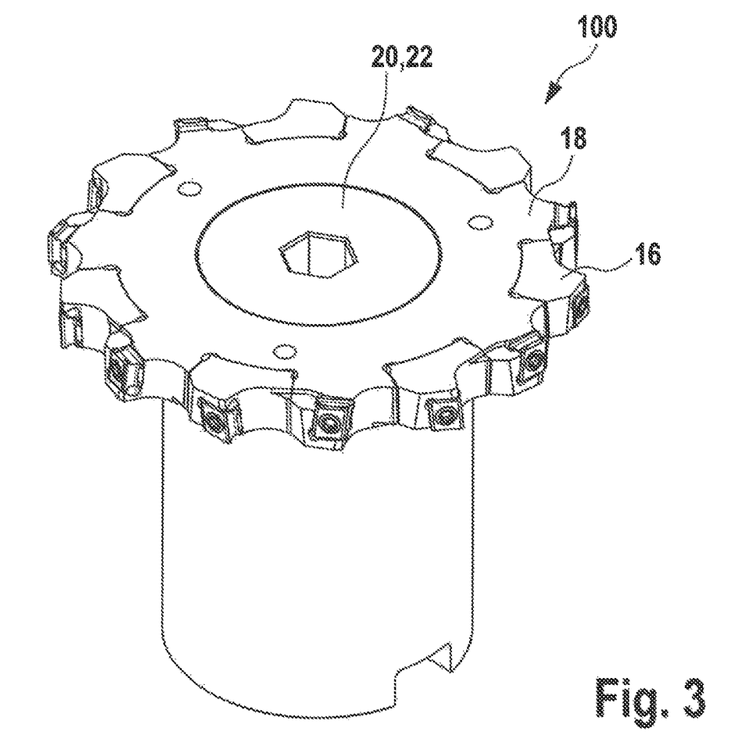
FIG. 3 shows a further perspective view of the exemplary embodiment shown in FIG. 1 in a first state.
Figure 4:
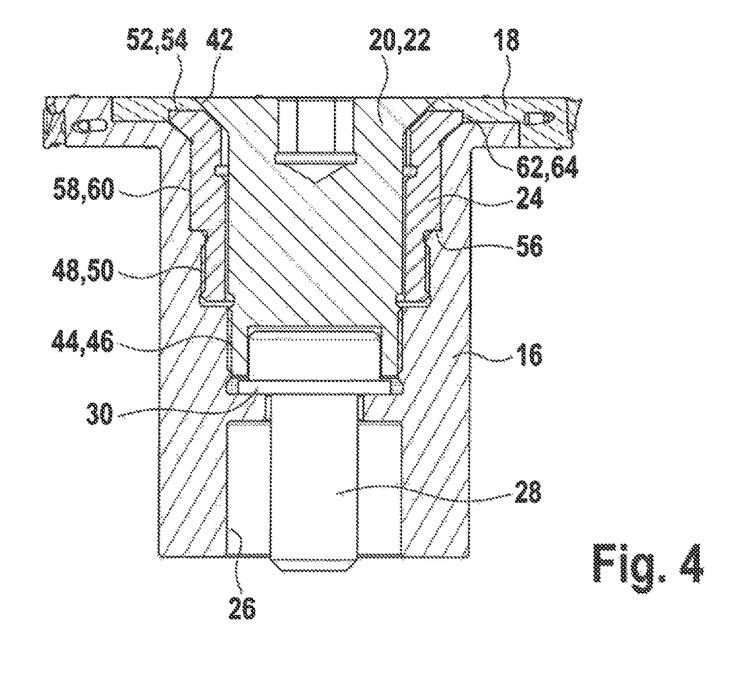
FIG. 4 shows a sectional view of the exemplary embodiment shown in FIG. 1 in the first state.

FIGS. 3 and 4 show a first state of the milling tool 100 where the milling width is set to the smallest value, that is to say the distance between the first holder part 16 and the second holder part 18 is as small as possible, and where the two holder parts 16, 18 are fixed by means of the locking mechanism 20 or the clamping screw 22. The clamping screw 22, in this case, presses with its conically formed head against a correspondingly formed conical surface 42 of the second holder part 18. As a result, the clamping screw 22 exerts force onto the second holder part 18 both in the axial direction and the radial direction. The spacer element 24 is not contacted, however, by the clamping screw 22. The clamping screw 22, without touching the spacer element 24, is screwed through the spacer element 24 into the first holder part 16. To this end, an external thread 44 which corresponds with an internal thread 46 provided in the interior of the first holder part 16, is provided on the underside of the clamping screw 22. Both threads 44, 46 are preferably designed as fine-pitch thread.

The spacer element 24 is also screwed into the first holder part 16 in the exemplary embodiment shown in the present case. To this end, an external thread 48, which corresponds with an internal thread 50 arranged in the interior of the first holder part 16, is provided on the lower end of the spacer element 24. For simpler differentiation, the thread 44-50 will be designated as follows below: The external thread 48 provided on the spacer element 24 is designated as the first thread. The internal thread 50 provided in the first holder part 16 is designated as the second thread. The internal thread 46 also provided in the first holder part 16 is designated as the third thread. The external thread 44 arranged on the clamping screw 22 is designated as the fourth thread. All threads 44-50 are preferably fine-pitch thread. The threads 46, 50 (second and third threads) provided in the first holder part 16 preferably extend coaxially but are offset to one another along the longitudinal axis 32.

In the mounted state, the clamping screw 22 presses among others in the axial direction against the second holder part 18. The second holder part 18 rests on the spacer element 24 in the axial direction. To this end, spacer element 24 and second holder part 18 each comprise an annular contact surface 52, 54, along which said two components contact one another. The annular contact surfaces 52, 54 serve as axial planar support. This serves substantially for the purpose of minimizing wobble errors.

The spacer element 24, as already mentioned, is screwed into the first holder part 16. In the state shown in FIG. 4, the spacer element 24 is screwed in fully up to a lower stop 56 which is provided for this purpose in the interior of the first holder part 16. In order to be able to keep the axial run-out tolerance and the concentricity tolerance of the milling tool 100 as small as possible, a clearance fit which functions as a centering means is provided in each case in the radial direction between the spacer element 24 and the first holder part 16 and also between the spacer element 24 and the second holder part 18. A cylinder surface 58 which extends symmetrically to the longitudinal axis 32 and in the present case is designated as the first cylinder surface, is provided for this purpose in the first holder part 16. Said first cylinder surface 58 corresponds with a cylinder surface 60 provided on the outer circumference of the spacer element 24. A cylinder surface 62 which extends symmetrically to the longitudinal axis 32 is provided in a similar manner on the second holder part 18 further at the top in FIG. 4. Said cylinder surface 62 is designated as the second cylinder surface in the present case. It corresponds with a cylinder surface 64 provided on the outer circumference of the upper end of the spacer element 24. A clearance fit is preferably provided between the cylinder surfaces 58, 60 and also between the cylinder surfaces 62, 64. The first cylinder surface 58 preferably extends coaxially to the second cylinder surface 62, the two cylinder surfaces 58, 62 being arranged offset to one other axially when the tool is in the mounted state.

Figure 5:
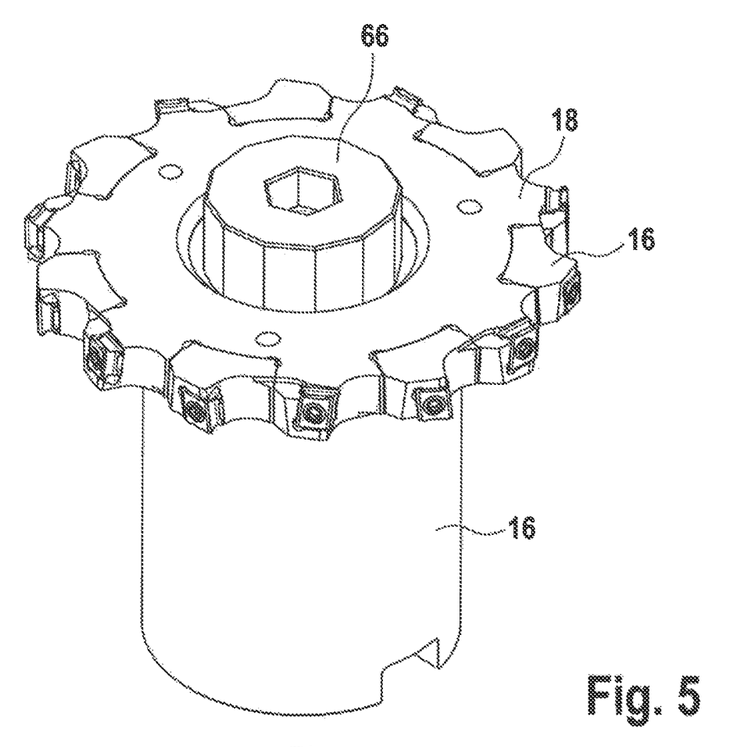
FIG. 5 shows a perspective view of the exemplary embodiment shown in FIG. 1 in a second state.
Figure 6:
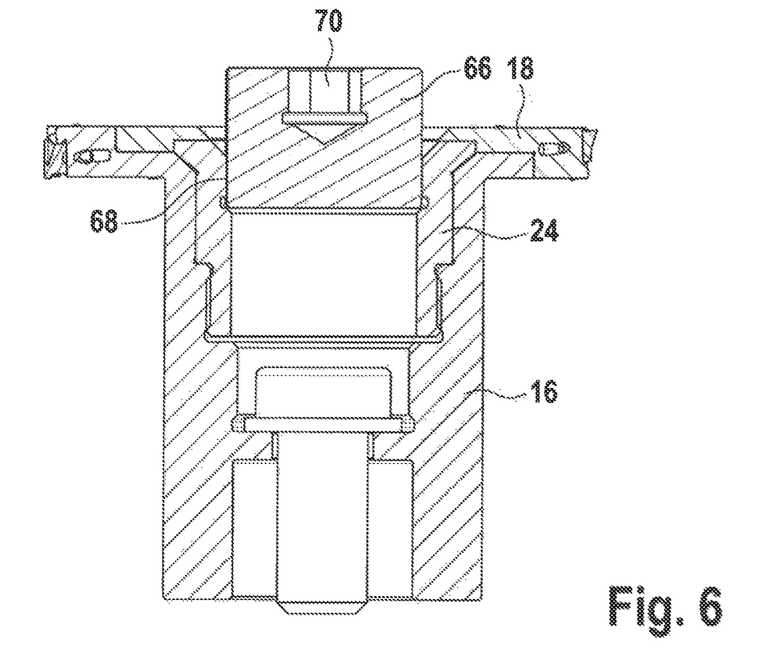
FIG. 6 shows a sectional view of the exemplary embodiment shown in FIG. 1 in the second state.
Figure 7:
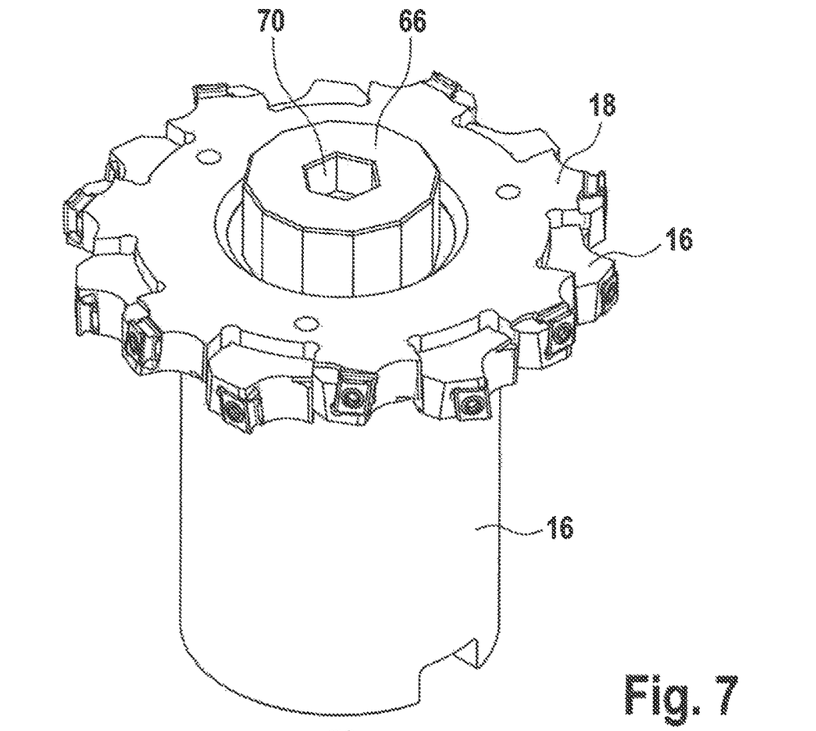
FIG. 7 shows a perspective view of the exemplary embodiment shown in FIG. 1 in a third state.
Figure 8:
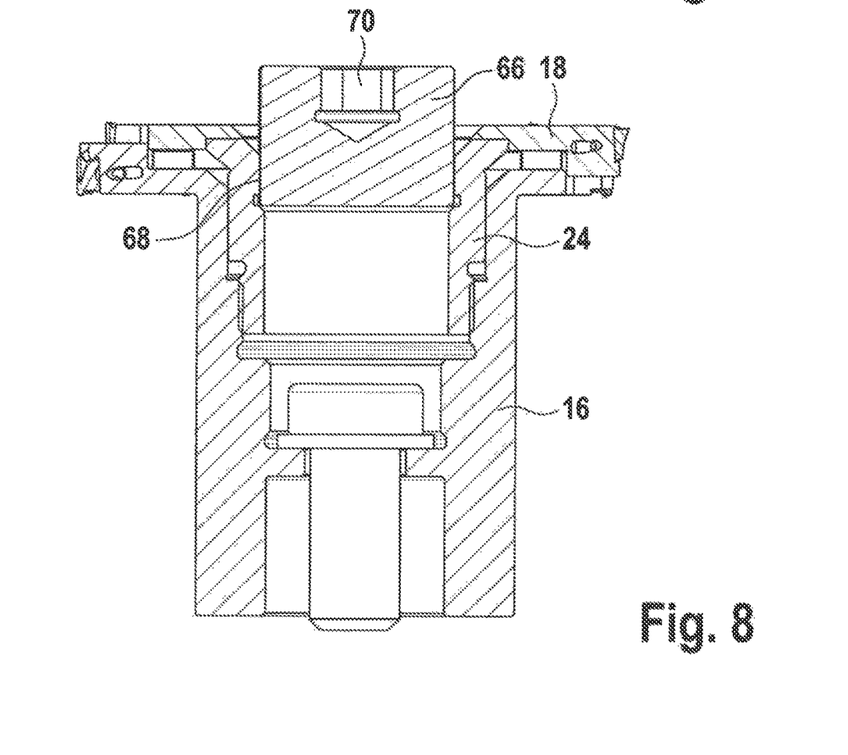
FIG. 8 shows a sectional view of the exemplary embodiment shown in FIG. 1 in the third state.

In order to modify the distance between the two holder parts 16, 18 and consequently the milling width, the spacer element 24 has to be moved into another position in relation to the first holder part 16 by screw connection. This operation is shown as an example in FIGS. 5-8. An adjustment adapter 66 is used here to screw-in or screw-out the spacer element 24. FIGS. 5 and 6 show the state in which the spacer element 24 is (still) screwed fully into the first holder part 16. FIGS. 7 and 8 show, in contrast, the state in which the spacer element 24 has already been screwed out of the first holder part 16 in part so that the milling width or the distance between the two holder parts 16, 18 is enlarged.

The adjustment adapter 66 engages in a tool engagement 68 which is arranged in the region of the upper end on the inside of the spacer element 24. In the present case, this is a multifaceted tool engagement. Said tool engagement 68 is designated in the present case as the first tool engagement. In the interior of the adjustment adapter 66, a second tool engagement 70 is furthermore provided, by means of which the adjustment adapter 66 can be moved. In the present case, this is designed as an Allen tool engagement. By inserting an Allen key into the second tool engagement 70, the adjustment adapter 66 and consequently also the spacer element 24 can consequently be moved very simply. It should be noted, however, at this point that other types of tool engagements for the tool engagements 68, 70 can obviously also be used without departing from the spirit and scope of the present disclosure. In principle, it is also possible to screw the spacer element 24 by hand into the holder part 16 or to screw it by hand out of said holder part.

Figure 9:
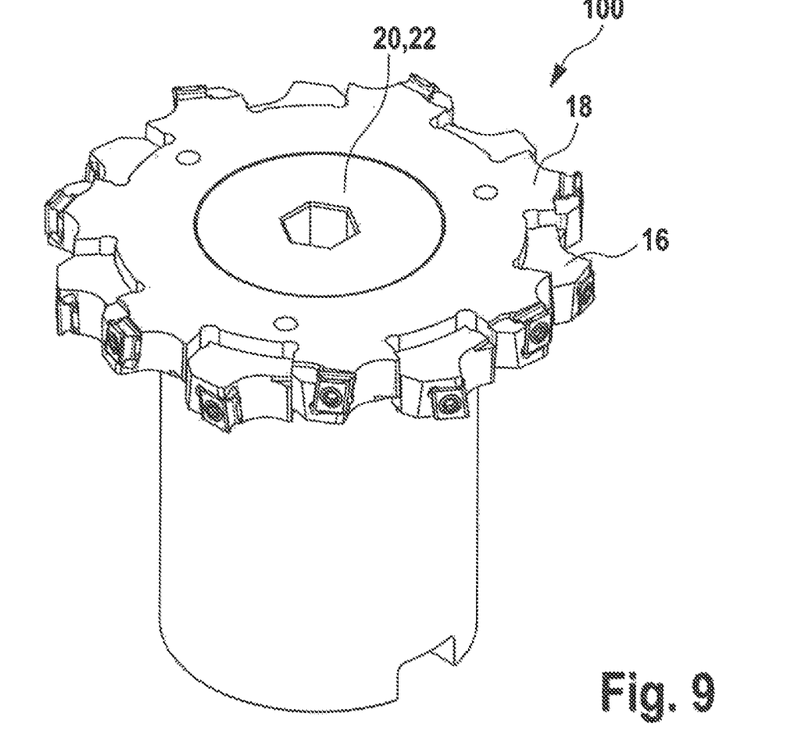
FIG. 9 shows a perspective view of the exemplary embodiment shown in FIG. 1 in a fourth state.
Figure 10:
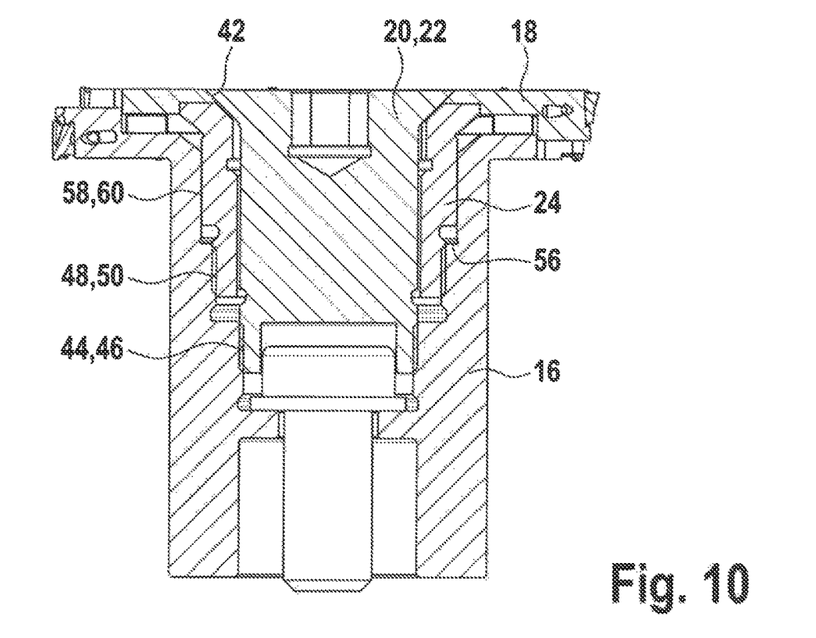
FIG. 10 shows a sectional view of the exemplary embodiment shown in FIG. 1 in the fourth state.

As soon as the desired milling width or the desired distance between the two holder parts 16, 18 is set, the two holder parts 16, 18 can be fixed again by means of the locking mechanism 20. This is shown in FIGS. 9 and 10. The state shown in FIGS. 9 and 10 corresponds therefore, once again, to the mounted state which is also shown in FIGS. 3 and 4, the distance between the two holder parts 16, 18 being enlarged in comparison thereto.

Finally, it should be mentioned that, in principle, another type of locking mechanism can be used in place of the clamping screw 22 used in the exemplary embodiment shown as an example in the present case. For example, a clamping mechanism could also be used for this purpose.

What is claimed is:

1. A milling tool holder, comprising:
    a first holder part having a first cutting insert receptacle which is configured to receive a first cutting insert and having a second cutting insert receptacle which is configured to receive a second cutting insert;
    a second holder part which is variably positionable with respect to the first holder part along a longitudinal axis in order to adjust a milling width, wherein the second holder part comprises a third cutting insert receptacle for receiving a third cutting insert and a fourth cutting insert receptacle for receiving a fourth cutting insert;
    a spacer element which is arranged between the first holder part and the second holder part and which is configured for adjusting the milling width;
    a locking mechanism which is configured to fix the first and second holder parts to the adjusted milling width,
    wherein the first holder part and the second holder part are positioned with respect to one another in such a manner that the third cutting insert receptacle is arranged in the circumferential direction between the first cutting insert receptacle and the second cutting insert receptacle, and in that the second cutting insert receptacle is arranged in the circumferential direction between the third cutting insert receptacle and the fourth cutting insert receptacle,
    wherein the first holder part comprises a first non-threaded cylinder surface which extends symmetrically to the longitudinal axis,
    wherein the second holder part comprises a second non-threaded cylinder surface which extends symmetrically to the longitudinal axis,
    wherein the spacer element comprises a third non-threaded cylinder surface which corresponds to the first non-threaded cylinder surface of the first holder part and contacts the first non-threaded cylinder surface of the first holder part to center the spacer element,
    wherein the spacer element comprises a fourth non-threaded cylinder surface which corresponds to the second non-threaded cylinder surface of the second holder part and contacts the second non-threaded cylinder surface of the second holder part to center the spacer element,
    wherein the spacer element comprises a first thread, which is distanced from the third non-threaded cylinder surface and the fourth non-threaded cylinder surface, and which corresponds with a second thread arranged in the first holder part, and
    wherein the milling width can be adjusted by an interaction between the first thread and the second thread.

2. The milling tool holder as claimed in claim 1, wherein the spacer element is configured as a sleeve.

3. The milling tool holder as claimed in claim 1, wherein the spacer element contacts the second holder part along an annular contact surface.

4. The milling tool holder as claimed in claim 3, wherein the annular contact surface is arranged perpendicularly to the longitudinal axis.

5. The milling tool holder as claimed in claim 1, wherein a clearance fit is provided between the first non-threaded cylinder surface and the third non-threaded cylinder surface.

6. The milling tool holder as claimed in claim 1, wherein a clearance fit is provided between the second non-threaded cylinder surface and the fourth non-threaded cylinder surface.

7. The milling tool holder as claimed in claim 1, comprising an adjustment adapter which is configured for adjusting the position of the spacer element, wherein the spacer element comprises a first tool engagement which matches the adjustment adapter, and wherein the adjustment adapter additionally comprises a second tool engagement.

8. The milling tool holder as claimed in claim 1, wherein the first holder part and the second holder part contact one another along multiple torque driving faces which correspond with one another, wherein the torque driving faces enclose an angle of less than 5° with a radial direction which extends perpendicularly with respect to the longitudinal axis and to the circumferential direction.

9. A milling tool holder, comprising:
    a first holder part having a first cutting insert receptacle which is configured to receive a first cutting insert and having a second cutting insert receptacle which is configured to receive a second cutting insert;
    a second holder part which is variably positionable with respect to the first holder part along a longitudinal axis in order to adjust a milling width, wherein the second holder part comprises a third cutting insert receptacle for receiving a third cutting insert and a fourth cutting insert receptacle for receiving a fourth cutting insert;
    a spacer element which is arranged between the first holder part and the second holder part and which is configured for adjusting the milling width;
    a locking mechanism which is configured to fix the first and second holder parts to the adjusted milling width,
    wherein the first holder part and the second holder part are positioned with respect to one another in such a manner that the third cutting insert receptacle is arranged in the circumferential direction between the first cutting insert receptacle and the second cutting insert receptacle, and in that the second cutting insert receptacle is arranged in the circumferential direction between the third cutting insert receptacle and the fourth cutting insert receptacle, wherein the first holder art comprises a first non-threaded cylinder surface which extends symmetrically to the longitudinal axis, wherein the second holder part comprises a second non-threaded cylinder surface which extends symmetrically to the longitudinal axis, wherein the spacer element comprises a third non-threaded cylinder surface which corresponds to the first non-threaded cylinder surface of the first holder part and contacts the first non-threaded cylinder surface of the first holder part to center the spacer element, wherein the spacer element comprises a fourth non-threaded cylinder surface which corresponds to the second non-threaded cylinder surface of the second holder part and contacts the second non-threaded cylinder surface of the second holder part to center the spacer element wherein the first non-threaded cylinder surface and the second non-threaded cylinder surface are offset with respect to one another along the longitudinal axis and extend coaxially with respect to one another, and wherein a diameter of the first non-threaded cylinder surface is different from a diameter of the second non-threaded cylinder surface.

10. The milling tool holder as claimed in claim 9, wherein the spacer element is configured as a sleeve.

11. The milling tool holder as claimed in claim 9, wherein the spacer element contacts the second holder part along an annular contact surface.

12. The milling tool holder as claimed in claim 11, wherein the annular contact surface is arranged perpendicularly to the longitudinal axis.

13. The milling tool holder as claimed in claim 9, wherein a clearance fit is provided between the first non-threaded cylinder surface and the third non-threaded cylinder surface.

14. A milling tool holder, comprising:
a first holder part having a first cutting insert receptacle which is configured to receive a first cutting insert and having a second cutting insert receptacle which is configured to receive a second cutting insert;
a second holder art which is variably positionable with respect to the first holder art along a longitudinal axis in order to adjust a milling width, wherein the second holder part comprises a third cutting insert receptacle for receiving a third cutting insert and a fourth cutting insert receptacle for receiving a fourth cutting insert;
a spacer element which is arranged between the first holder part and the second holder art and which is configured for adjusting the milling width;
a locking mechanism which is configured to fix the first and second holder parts to the adjusted milling width, wherein the locking mechanism comprises a screw which is inserted through the spacer element into a thread which is arranged in the first holder part;
wherein the first holder part and the second holder part are positioned with respect to one another in such a manner that the third cutting insert receptacle is arranged in the circumferential direction between the first cutting insert receptacle and the second cutting insert receptacle, and in that the second cutting insert receptacle is arranged in the circumferential direction between the third cutting insert receptacle and the fourth cutting insert receptacle,
wherein the first holder part comprises a first non-threaded cylinder surface which extends symmetrically to the longitudinal axis,
wherein the second holder part comprises a second non-threaded cylinder surface which extends symmetrically to the longitudinal axis,
wherein the spacer element comprises a third non-threaded cylinder surface which corresponds to the first non-threaded cylinder surface of the first holder part and contacts the first non-threaded cylinder surface of the first holder part to center the spacer element, and
wherein the spacer element comprises a fourth non-threaded cylinder surface which corresponds to the second non-threaded cylinder surface of the second holder part and contacts the second non-threaded cylinder surface of the second holder part to center the spacer element.

15. The milling tool holder as claimed in claim 14, wherein the screw contacts the first holder part and the second holder part but not the spacer element.

16. The milling tool holder as claimed in claim 15, wherein the screw contacts the second holder part along a conical surface.

17. The milling tool holder as claimed in claim 14, wherein the spacer element is configured as a sleeve.

18. The milling tool holder as claimed in claim 14, wherein the spacer element contacts the second holder part along an annular contact surface.

19. The milling tool holder as claimed in claim 18, wherein the annular contact surface is arranged perpendicularly to the longitudinal axis.

20. The milling tool holder as claimed in claim 14, wherein a clearance fit is provided between the first non-threaded cylinder surface and the third non-threaded cylinder surface.

* * * * *